United States Patent [19]

Nagase et al.

[11] Patent Number: 5,315,450
[45] Date of Patent: May 24, 1994

[54] DUAL HEAD TYPE MAGNETIC DISK RECORDING/REPRODUCING APPARATUS

[75] Inventors: Fumio Nagase; Toru Tanabe, both of Tokyo, Japan

[73] Assignee: TEAC Corporation, Tokyo, Japan

[21] Appl. No.: 93,330

[22] Filed: Jul. 16, 1993

Related U.S. Application Data

[63] Continuation of Ser. No. 729,216, Jul. 12, 1991, abandoned, which is a continuation-in-part of Ser. No. 388,566, Aug. 1, 1989, abandoned.

[30] Foreign Application Priority Data

Aug. 2, 1988 [JP] Japan ................... 63-193288

[51] Int. Cl.$^5$ .............................................. G11B 5/09
[52] U.S. Cl. .................................... 360/65; 360/67
[58] Field of Search ........................................ 360/65

[56] References Cited

U.S. PATENT DOCUMENTS

| | | | |
|---|---|---|---|
| 2,901,737 | 8/1959 | Stovall, Jr. ................... | 360/65 |
| 4,244,008 | 1/1981 | Holt ........................ | 360/65 |
| 4,306,257 | 12/1981 | Harman ..................... | 360/65 |
| 4,564,869 | 1/1986 | Baumeister .................. | 360/65 |
| 4,651,236 | 3/1987 | Ouchi et al. ................. | 360/65 |
| 4,722,010 | 1/1988 | Suzuki et al. ................ | 360/65 |

OTHER PUBLICATIONS

Article entitled "State of the Art Floppy Disk Drive and its Application Know-How", by Shogi Takahashi, CQ Publication Ltd., Tokyo 1984.

*IBM Technical Disclosure Bulletin*, vol. 20, No. 3, Aug. 1977 entitled "Filter Select Circuit for Magnetic Disk Read Channel" by Lovgren et al.

*Primary Examiner*—Vincent P. Canney
*Attorney, Agent, or Firm*—Michael N. Meller

[57] ABSTRACT

A dual head type magnetic disk according/reproducing apparatus, in which a magnetic disk is inserted and/or from which the magnetic disk is ejected, the magnetic disk having a first surface and a second surface each of which is segmented into a plurality of tracks, each track having a corresponding track number, the dual head type magnetic disk recording/reproducing apparatus includes a first magnetic head which reproduces an information signal from a first track on the first surface, a second magnetic head which reproduces an information signal from a second track on the second surface, a track number of the second track corresponding to that of the first track, and a predetermined number of tracks being between the first track and a radial location of the second track, a low pass filter, coupled to the first and second magnetic heads, to which the information signals reproduced by the first and second magnetic heads are supplied, and control means, coupled to the low pass filter, for adjusting a cut-off frequency of the low pass filter so that a resolution of the information signal reproduced at the first track and that of the information signal reproduced at the second track can be approximately equal to each other.

6 Claims, 9 Drawing Sheets

DUAL HEAD TYPE MAGNETIC DISK RECORDING/REPRODUCING APPARATUS

This application is a continuation of application Ser. No. 729,216, filed Jul. 12, 1991, now abandoned, which is a continuation-in-part application of Ser. No. 388,566 filed Aug. 1, 1989.

BACKGROUND OF THE INVENTION

The present invention generally relates to magnetic disk recording/reproducing apparatus for recording and/or reproducing an information signal on and from a magnetic disk, and more particularly to a dual head type magnetic disk recording/reproducing apparatus for recording and/or reproducing the information signal on and from both sides of a flexible magnetic disk by a pair of magnetic heads.

Conventionally, there is a so-called dual head type magnetic disk recording/reproducing apparatus provided with a pair of magnetic read/write heads so as to perform recording and/or reproducing of an information signal on and from both sides of a flexible magnetic disk by respective heads. In such a magnetic disk recording/reproducing apparatus, the magnetic heads are provided such that one of the heads is offset in position relative to the other by about four to eight track pitches depending on the recording density in a moving direction of a carriage carrying the magnetic heads to avoid crosstalk between the information signals recorded on both sides of the magnetic disk.

In such an apparatus, even if a first track on the side O of the magnetic disk has the same track number as a second track on the side I thereof, a track radius of the first track differs from that of the second track. Responsive thereto, there appears a difference in resolution between the information signal reproduced from the side O and the information signal reproduced from the side I of the magnetic disk. This difference in the resolution becomes significant with increasing recording density and causes a problem in the recent magnetic disk recording/reproducing apparatus designed to operate with an increased recording density.

SUMMARY OF THE INVENTION

Accordingly, it is an object of the present invention to provide a novel and useful dual head type magnetic disk recording/reproducing apparatus wherein the aforementioned problems are eliminated.

According to one feature of the present invention, a dual head type magnetic disk recording/reproducing apparatus, in which a magnetic disk is inserted and/or from which the magnetic disk is ejected, the magnetic disk having a first surface and a second surface each of which is segmented into a plurality of tracks, each track having a corresponding track number, the dual head type magnetic disk recording/reproducing apparatus comprises a first magnetic head which reproduces an information signal from a first track on the first surface, a second magnetic head which reproduces an information signal from a second track on the second surface, a track number of the second track corresponding to that of the first track, and a predetermined number of tracks being between the first track and a radial location of the second track, a low pass filter, coupled to the first and second magnetic heads, to which the information signals reproduced by the first and second magnetic heads are supplied, and control means, coupled to the low pass filter, for adjusting a cut-off frequency of the low pass filter so that a resolution of the information signal reproduced at the first track and that of the information signal reproduced at the second track can be approximately equal to each other.

According to another feature of the present invention, a dual head type magnetic disk recording/reproducing apparatus, in which a magnetic disk is inserted and/or from which the magnetic disk is ejected, the magnetic disk having a first surface and a second surface each of which is segmented into a plurality of tracks, each track having a corresponding track number, the dual head type magnetic disk recording/reproducing apparatus comprises a first magnetic head which reproduces an information signal from a first track on the first surface, a second magnetic head which reproduces an information signal from a second track on the second surface, a track number of the second track corresponding to that of the first track, and a predetermined number of tracks being between the first track and a radial location of the second track, a resonance circuit, coupled to the first and second magnetic heads, to which the information signals reproduced by the first and second magnetic heads are supplied, and control means, coupled to the resonance circuit, for adjusting a Q-factor of the resonance circuit so that a resolution of the information signal reproduced at the first track and that of the information signal reproduced at the second track can be approximately equal to each other.

According to still another feature of the present invention, a dual head type magnetic disk recording/reproducing apparatus, in which a magnetic disk is inserted and/or from which the magnetic disk is ejected, the magnetic disk having a first surface and a second surface each of which is segmented into a plurality of tracks, each track having a corresponding track number, the dual head type magnetic disk recording/reproducing apparatus comprises a first magnetic head which reproduces an information signal from a first track on the first surface, a second magnetic head which reproduces an information signal from a second track on the second surface, a track number of the second track corresponding to that of the first track, and a predetermined number of tracks being between the first track and a radial location of the second track, a resonance circuit, coupled to the first and second magnetic heads, to which the information signals reproduced by the first and second magnetic heads are supplied, and control means, coupled to the resonance circuit, for adjusting a resonance frequency of the resonance circuit so that a resolution of the information signal reproduced at the first track and that of the information signal reproduced at the second track can be approximately equal to each other.

According to another feature of the present invention, a dual head type magnetic disk recording/reproducing apparatus, in which a magnetic disk is inserted and/or from which the magnetic disk is ejected, the magnetic disk having a first surface and a second surface each of which is segmented into a plurality of tracks, each track having a corresponding track number, the dual head type magnetic disk recording/reproducing apparatus comprises a first magnetic head which records an information signal on a first track on the first surface, a second magnetic head which records an information signal on a second track on the second surface, a track number of the second track corresponding to that of the first track, and a predetermined number of tracks being between the first track and a radial location of the second track, recording current generating means, coupled to the first and second magnetic heads, for generating a recording current to be supplied to either the first or second magnetic head which is used for recording the information signal, and control means, coupled to the recording current producing means, for adjusting a level of the recording current so that a resolution of the information signal recorded at the first track and that of the information signal recorded at the second track can be approximately equal to each other.

According to the present invention, the resolution of the information signal picked up from a track traced by the first magnetic head and the resolution of the information signal picked up from the track traced by the second magnetic head become equivalent to each other when passed through the low pass filter and the difference in the signal characteristic caused by the positional difference of the first and second magnetic heads is eliminated.

Other objects and further features of the present invention will become apparent from the following detailed description when read in conjunction with attached drawings.

DETAILED DESCRIPTION

Figure 2:
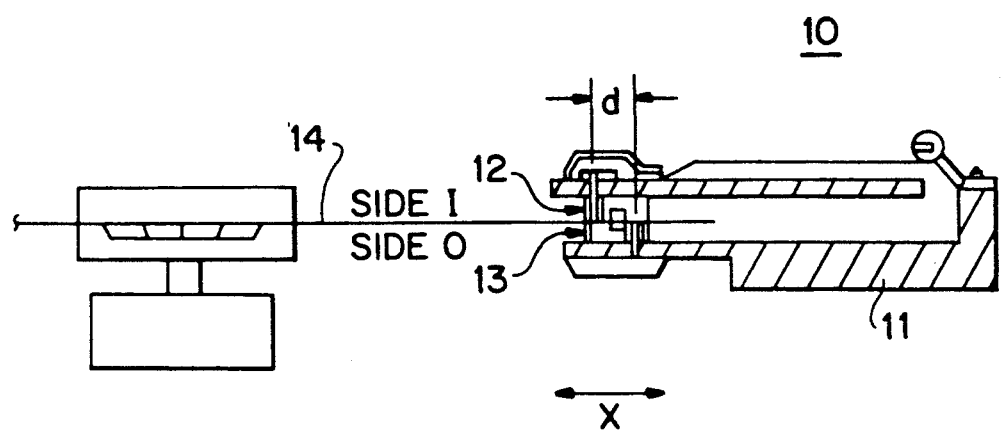
FIG. 2 is a schematical view showing a general construction of the dual head type magnetic disk apparatus of FIG. 1.

Referring to FIG. 2, a dual head type magnetic disk apparatus 10 comprises a head carriage 11 on which a magnetic head 12 and a magnetic head 13 are mounted such that the magnetic heads 12 and 13 contact a rotary magnetic disk 14 on both sides while the head carriage I1 is moved in a direction shown by an arrow X. The magnetic disk 14 has a front side I and a rear side O on which tracks 00, 01, 02, etc. are defined as shown in FIG. 3.

Figure 3:
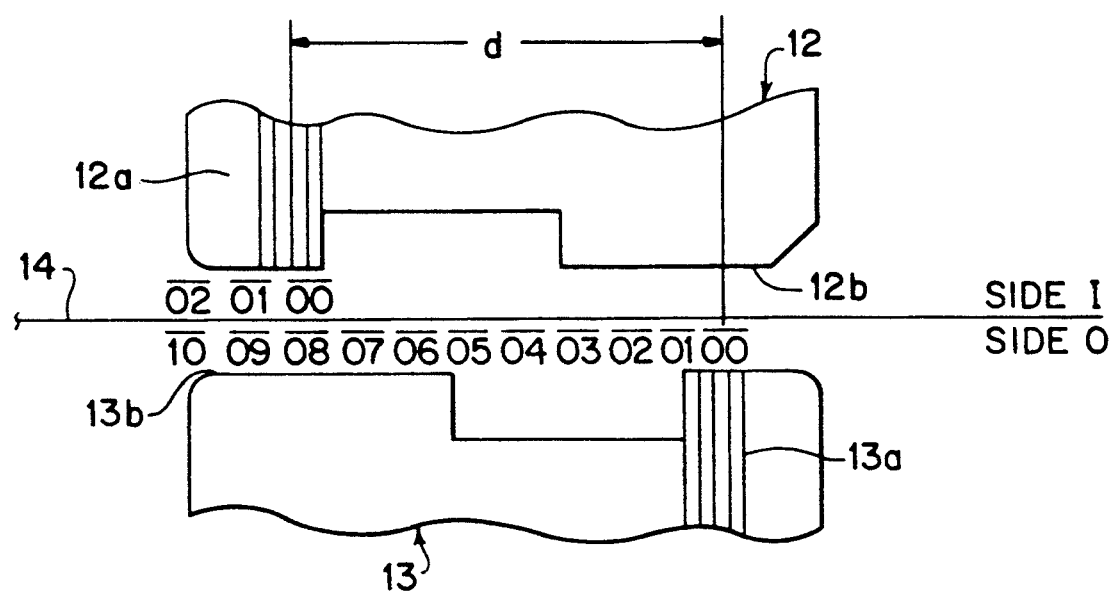
FIG. 3 is a view showing a part of FIG. 2 on an enlarged scale.

Referring to FIG. 3 showing the detailed construction of the magnetic heads of the apparatus, it can be seen that a read/write head part 12a carried by a slider part 12b of the magnetic head 12 is offset radial direction of the disk 14 by a distance d corresponding to eight track pitches relative to a read/write head part 13a carried by a slider part 13b of the magnetic head 13.

Figure 1:
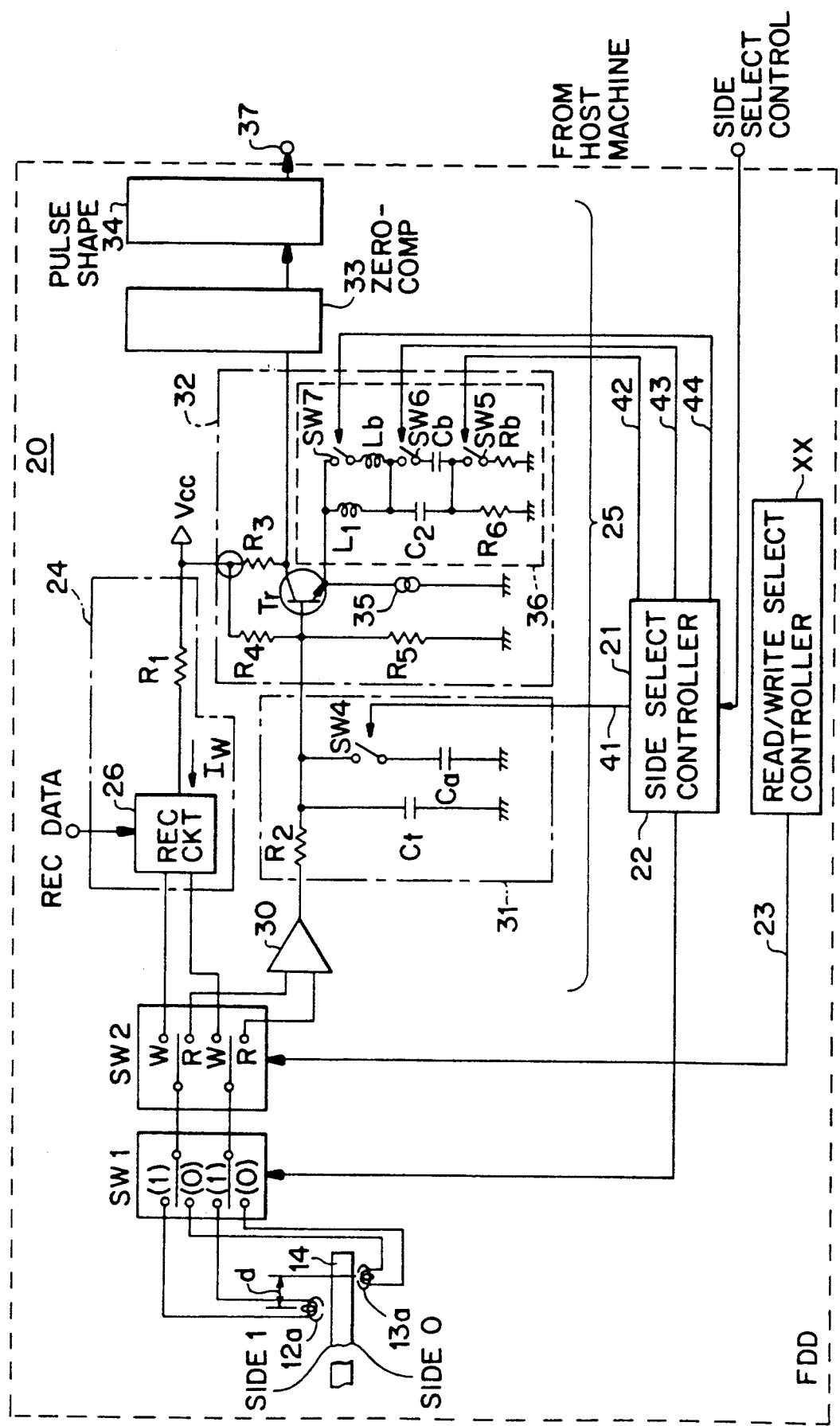
FIG. 1 is a circuit diagram showing a first embodiment of the dual head type magnetic disk apparatus of the present invention.

FIG. 1 shows an electrical system 20 of the apparatus 10. Referring to FIG. 1, the read/write head parts 12a and 13a are connected to a switch $SW_1$ which is controlled by a side select signal supplied from an external host machine thereto via a controller 21 through a line 22 whereby the switch $SW_1$ selects either the read/write head part 12a or the read/write head part 13a responsive to the side select signal, as is disclosed in the prior art. The switch $SW_1$ is not connected to another switch $SW_2$ which is controlled by a read/write control signal produced by the controller XX and supplied thereto through a line 23 whereby the switch $SW_2$ selectively connects the read/write head parts $12a$ and $13a$ to a recording system 24 or to a reproducing system 25 responsive to the read/write control signal, as is disclosed in the prior art.

The recording system 24 comprises a recording circuit 26 and a resistor $R_1$ connected in series between the source voltage $V_{CC}$ and the recording system 24 similarly to the conventional apparatus modulates a recording current Iw by a data to be written in. The current $I_W$ thus modulated is then supplied to the read/write head part $12a$ or the read/write head part $13a$ via the switch $SW_2$ selecting the recording system 24 responsive to the read/write control signal and the switch $SW_1$ selecting either the read/write head part $12a$ or the read/write head part $13a$ responsive to the side select signal.

The reproducing system 25 comprises a preamplifier 30 for receiving a reproduced signal from the read/write head part $12a$ or $13a$, a low pass filter 31 supplied with an output signal from the preamplifier 30 for cutting a high frequency component therefrom according to a predetermined frequency characteristic, a differentiation circuit 32 for differentiating the reproduced signal thus filtered, and a zero-volt comparator 33 and a pulse shaping circuit 34 for conventional processing of the reproduced signal thus differentiated, such as by zero-crossing detection and output pulse formation. This construction of the reproducing system 25 is identical to that of the prior art apparatus except for the part including the low pass filter 31 and the differentiation circuit 32. In the description hereinafter, description of those parts common with the prior art apparatus will be omitted.

The low pass filter 31 has a similar construction to conventional low pass filter in that it comprises a resistor $R_2$ having an end connected to an output port of the preamplifier 30 and a capacitor $C_1$ for grounding the other end of the resistor $R_2$. However, the filter 31 is different from the prior art filter device in that it has another capacitor $C_a$ connected parallel to the capacitor $C_1$ via a switch $SW_4$ such that the capacitor $C_a$ grounds the other end of the resistor $R_2$ when the switch $SW_4$ is closed.

The differentiation circuit 32 comprises an NPN transistor Tr having a base connected to an output port of the low pass filter 31 for receiving a reproduced signal therefrom after filtration, a constant-current source 35 interposed between an emitter of the transistor Tr and the ground, a resistor $R_3$ for supplying a driving voltage from a driving voltage source $V_{CC}$ to a collector of the transistor Tr, resistors $R_4$ and $R_5$ forming a voltage divider between the voltage source $V_{CC}$ and the ground for biasing the base of the transistor Tr, a resonance circuit 36 comprising serial connection of a coil $L_1$, a capacitor $C_2$ and a resistor $R_6$ connected between the emitter of the transistor Tr and the ground in parallel to the constant-current source 35, and another circuit part connected to the resonance circuit 36. This another circuit part comprises a resistor $R_b$ connected parallel across the resistor $R_6$ via a switch $SW_5$, a capacitor $C_b$ connected in parallel across the capacitor $C_2$ via a switch $SW_6$ and a coil $L_b$ connected in parallel across the coil $L_1$ via a switch $SW_7$.

The controller 21 controls the switches $SW_4$–$SW_7$ by a side select signal supplied from the host machine which specifies the side of the disk via lines 41–44 respectively and responsive thereto the switches $SW_4$–$SW_7$ are turned on and turned off.

Next, operation of the electrical system 20 will be described.

When recording a data, the recording current $I_W$ is modulated as already described and recording is made on the side O or the side I of the disk responsive to the side select signal supplied to the switch $SW_1$ and the read/write control signal supplied to the switch $SW_2$. In this state, the switch $SW_2$ is connected to a contact W shown in FIG. 1 and the recording system 24 is connected to the read/write head parts $12a$, $13a$ via the switch $SW_1$. The switch $SW_1$ simply connects the recording system 24 to either the read/write head part $12a$ or the read/write head part $13a$ of the magnetic heads 12 and 13 and the recording is made similarly on both sides of the magnetic disk 14.

When reading the data from the disk, the switch $SW_2$ is switched to a side of contact R shown in FIG. 1. Further, the switch $SW_1$ is switched between a contact (0) and a contact (1) responsive to the side select signal from the controller 21. When the controller 21 produces a side select signal L specifying the side O of the disk 14, the switch 21 is connected to the contact (0) and the signal reproduced by the read/write head part $13a$ of the magnetic head 13 is supplied to the reproducing system 25 after passing through the switches $SW_1$ and $SW_2$. When the controller 21 produces a side select signal H specifying the side I of the disk 14, on the other hand, the switch $SW_1$ is connected to the contact (1) and the information signal reproduced by the read/write head part $12a$ of the magnetic head 12 is supplied to the reproducing system 25 after passing through the switches $SW_1$ and $SW_2$.

In the present invention, the characteristic of the reproducing system 25 is changed depending on whether the reproducing of the information signal is made by the read/write head part $12a$ or by the read/write head part $13a$ such that the signal characteristic of the information signal reproduced from the side O of the disk 14 becomes identical to that of the signal reproduced from the side I of the disk 14. Such an equalization may be made according to one or more of the methods described below.

1) Changing Cutoff Frequency of Low Pass Filter

According to this method, the switch $SW_4$ is controlled by the side select signal on the line 31 as listed in the following table so as to change the cutoff frequency of the low pass filter 31.

TABLE I

| CHANGE IN THE CUTOFF FREQUENCY | | |
|---|---|---|
| Side select signal | $SW_4$ | Cutoff frequency $f_0(f_1)$ |
| H | OFF | $f_1 = \frac{1}{2}\_C_1R_2$ = 500 kHz |
| L | ON | $f_0 = \frac{1}{2}\_(C_1+C_a)R_2$ = 450 kHz |

Figure 4:
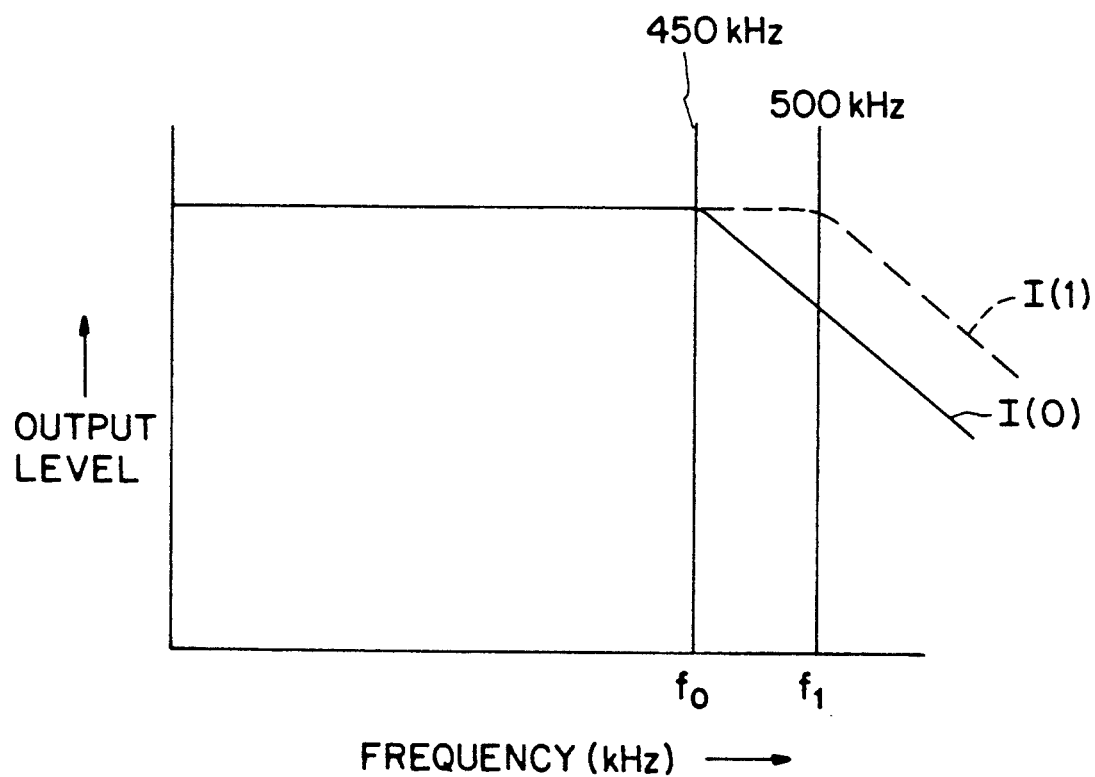
FIG. 4 is a graph showing a characteristic curve of a low pass filter of FIG. 1 in which the cutoff frequency of the filter is changed.

Referring to TABLE I, it can be seen that the switch $SW_4$ is turned off when the information signal on the side I of the disk 14 is reproduced responsive to the side select signal having a state H. In this state, the capacitor $C_a$ is disconnected from the capacitor $C_1$ and the low pass filter 31 has a cutoff frequency $f_1$ of 500 kHz. This characteristic is shown in FIG. 4 by a line I(1). Note that FIG. 4 shows a characteristic of the low pass filter 31 when an oscillator is connected to the input port of the preamplifier 30. When the side select signal is changed to the state L, on the other hand, the switch SW$_4$ is turned on and the capacitor C$_a$ is connected to the capacitor C$_1$ whereby the cutoff frequency of the low pass filter 31 is changed from the frequency f$_1$ to a frequency f$_0$ which is equal to 450 kHz as illustrated in FIG. 4 by a line I(0). In other words, the information signal reproduced from the side I of the disk 14 is passed through the low pass filter 31 having the characteristic shown by a line I(1) while the information signal reproduced from the side O of the disk 14 is passed through the low pass filter 31 having the characteristic represented by the line I(0). FIGS. 9A to 9D respectively show an output spectrum representing a relationship between a frequency and an output level of the head. According to the low pass filter, odd numbered harmonic wave components of the side O and those of the side I can be equal to each other.

By changing the transmission characteristic of the low pass filter 31 as such, the resolution of the track on the side I in contact with the read/write head part 13$a$ becomes identical to that of the track on the side O in contact with the read/write head part 12$a$ and the difference in the signal characteristic between the information signal reproduced by the read/write head part 13$a$ and that reproduced by the read/write head part 12$a$ due to the positional difference between the head parts 12$a$ and 13$a$ is successfully eliminated.

The change of the cutoff frequency of the low pass filter 31 can also be achieved by connecting a circuit comprising a serial connection of a switch and a resistor in parallel to the resistor R$_2$ so that the overall resistance thus formed across the resistor R$_2$ is changed responsive to opening and closure of this switch.

2) Changing Q-factor of Differentiation Circuit

According to this method, the switch SW$_5$ is controlled by the side select signal on the line 42 such that the Q-factor of the differentiation circuit 32 is changed responsive to turning on and off of the switch SW$_5$.

TABLE II

| CHANGE OF THE Q-VALUE | | |
|---|---|---|
| Side select signal | SW$_5$ | Q-FACTOR |
| H | ON | Q = WL.R$_6$.R$_b$/(R$_6$ + R$_b$) = Q$_1$ |
| L | OFF | Q = WL/R$_6$ = $\infty$ |

Figure 5:
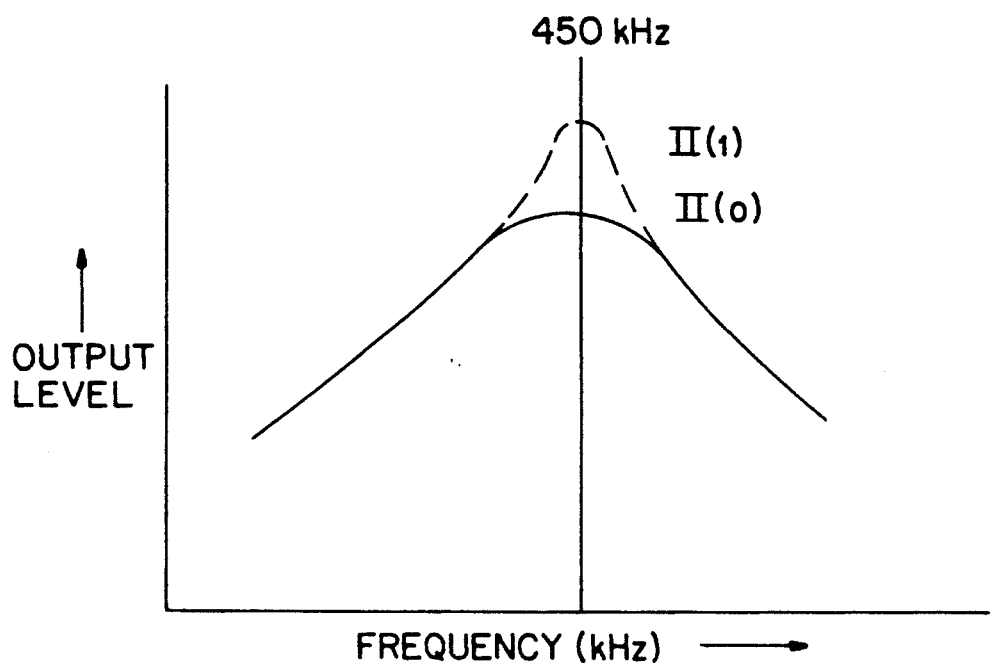
FIG. 5 is a graph showing a characteristic of a resonance circuit formed in a differentiation circuit of FIG. 1 for a case in which the Q-factor is changed.
Figure 6:
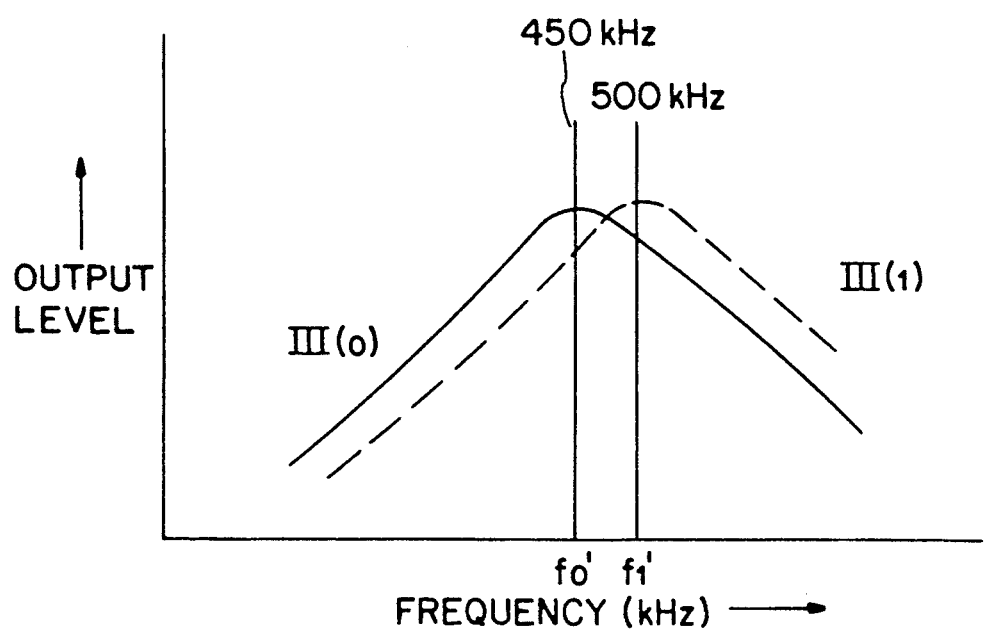
FIG. 6 is a graph showing a characteristic of the resonance circuit for a case in which the resonant frequency is changed.

Referring to TABLE II, the switch SW$_5$ is closed when the side select signal is the in H state and the information signal is reproduced from the side I of the disk 14, and responsive thereto the Q-factor assumes a value Q$_1$. In this state, the resonance circuit 36 has a characteristic shown by a line II(1) in FIG. 5. Note that FIGS. 5 and 6 represent the signal characteristic of the differentiation circuit 32 viewed from its output side in a state that an oscillator is connected to an input port of the preamplifier 30.

When the side select signal is switched to the state L, the switch SW$_5$ is opened and the resistor R$_b$ is disconnected from the resistor R$_6$. Responsive thereto, the Q-values is changed from Q$_1$ to Q$_0$ and the resonance circuit exhibits a characteristic shown in FIG. 5 by a line II(0).

By changing the Q-factor responsive to the side of the disk from which the reproducing of the information signal is made, the output signal called DIF signal of the differentiation circuit 32 assumes a same waveform, as shown in FIGS. 9E to 9H, when the reproducing is made from the side I and when the reproducing is made from the side O of the disk 14. The value of Q$_0$ and Q$_1$ is set such that a saddle point of the DIF signal appearing in correspondence to the data "0" does not cause zero-crossing, and the value of R$_b$ is generally set to be 50–200 times larger than the value of R$_6$.

3) Changing Resonant Frequency of Differentiation Circuit

Responsive to the side select signals on the line 43 and line 44, the switch SW$_6$ and the switch SW$_7$ are respectively turned on and turned off as shown in the following table so as to change the resonant frequency of the resonance circuit 36 in the differentiation circuit 32.

TABLE III

| CHANGE OF THE RESONANT FREQUENCY | | | |
|---|---|---|---|
| Side select signal | SW$_6$ | SW$_7$ | Resonant frequency f = $\frac{1}{\sqrt{LC}}$ |
| H | OFF | ON | f$_1'$ = 500 kHz |
| L | ON | OFF | f$_0'$ = 450 kHz |

When the side select signal is H and the information signal is reproduced from the side I of the disk 14, the switch SW$_6$ is turned off while the switch SW$_7$ is turned on. Thus, the capacitor C$_b$ is disconnected from the capacitor C$_2$ while the coil L$_b$ is connected to the coil L$_1$. In this state, the resonant frequency f$_1'$ is 500 kHz and the resonant circuit 36 has a characteristic shown in FIG. 6 by a line III(1).

When the side select signal is changed to the L state, the switch SW$_6$ turned on and the switch SW$_7$ is turned off. Responsive thereto, the capacitor C$_b$ is connected to the capacitor C$_2$ and the coil L$_b$ is disconnected from the coil L$_1$. As a result, the resonant frequency is decreased to a frequency f$_0'$ which is equal to 450 kHz and the resonance circuit 36 assumes a characteristic shown in FIG. 6 by a line III(0).

By changing the resonant frequency in dependence on the side of the disk from which the information signal is to be reproduced, one can obtain a signal characteristic for the signal reproduced from the side O of the disk 14 which is substantially identical to that of the signal reproduced from the side I of the disk 14, as shown in FIGS. 9I to 9L. In this procedure, one may actuate only one of the switches SW$_6$ and SW$_7$ with a similar result. Further, it is not necessary that all of the methods 1), 2) and 3) described heretofore be used in combination but any one of the methods 1), 2) and 3) may be used independently.

Figure 7:
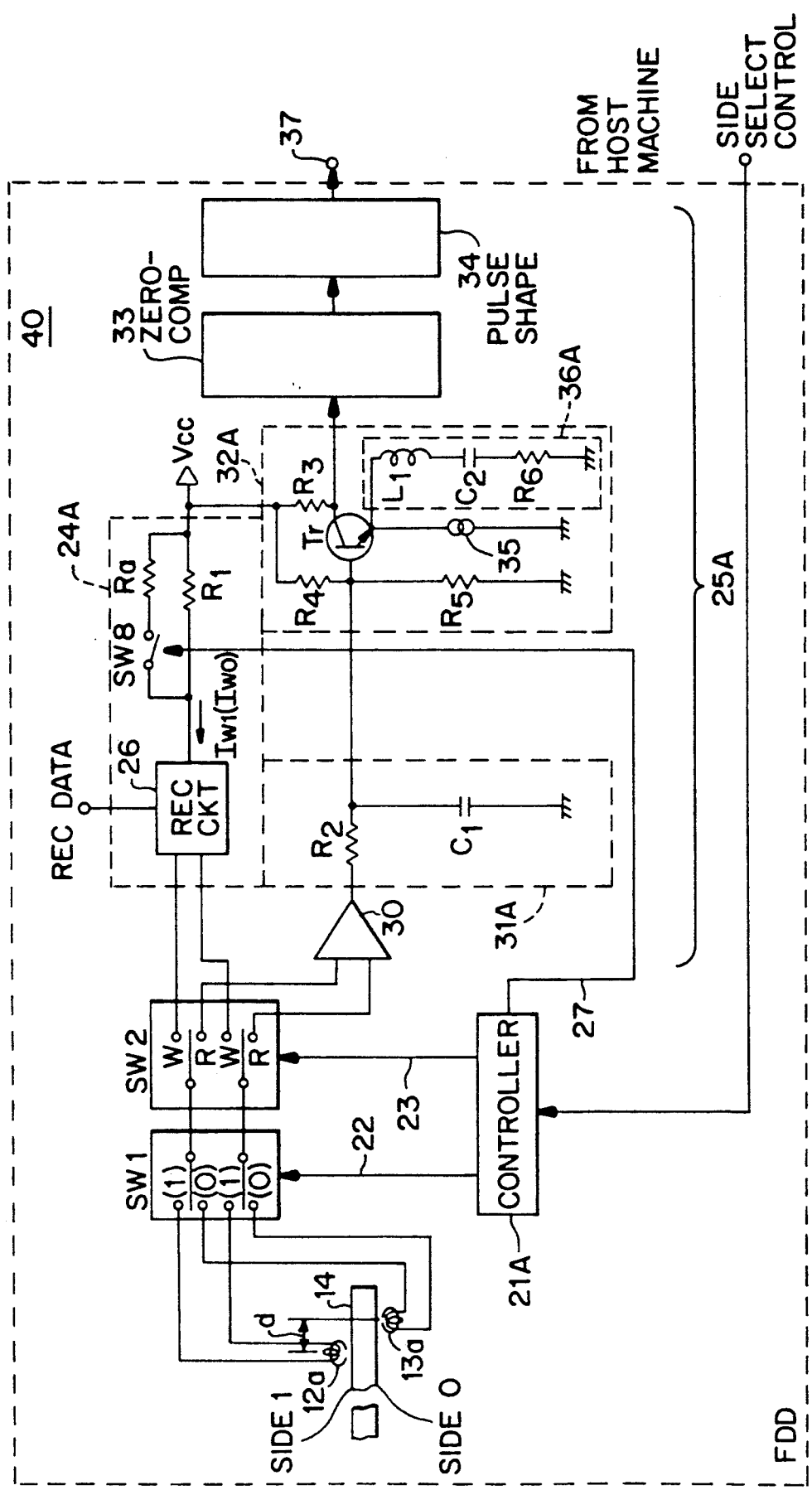
FIG. 7 is a circuit diagram showing a second embodiment of the dual head type magnetic disk apparatus of the present invention.

Next, a second embodiment of the present invention will be described with reference to FIG. 7 showing an electronic system 40 used in this embodiment In the drawing, the parts constructed identically to those corresponding parts in the preceding drawings are given identical reference numerals and the description thereof will be omitted.

Referring to FIG. 7, the system 40 has a recording system 24A comprising the recording circuit 26, the resistor R$_1$ connected in series between the circuit 26 and the drive voltage source V$_{CC}$, and a resistor R$_a$ connected parallel to the resistor R$_1$ by a switch SW$_8$ controlled by a side select signal supplied from a control circuit 21A via a line 27. Further, the apparatus 40 has a reproducing system 25A comprising the preamplifier 30, a low pass filter 31A comprising the resistor $R_2$ and capacitor $C_1$ for filtering the output signal of the preamplifier 30, a differentiation circuit 32A comprising the NPN transistor Tr, the constant-current source 35, the resistors $R_3$, $R_4$, $R_5$, and a resonance circuit 36A constructed by the coil $L_1$, capacitor $C_2$ and the resistor $R_6$. As the construction of the reproducing system 25A is substantially identical to that of the system 25 except that the circuit components associated with the switches $SW_5$–$SW_7$ such as the capacitors $C_a$ and $C_b$, the resistor $R_b$ and the coil $L_b$ in the first embodiment are simply omitted, further description thereof will be omitted.

Figure 8:
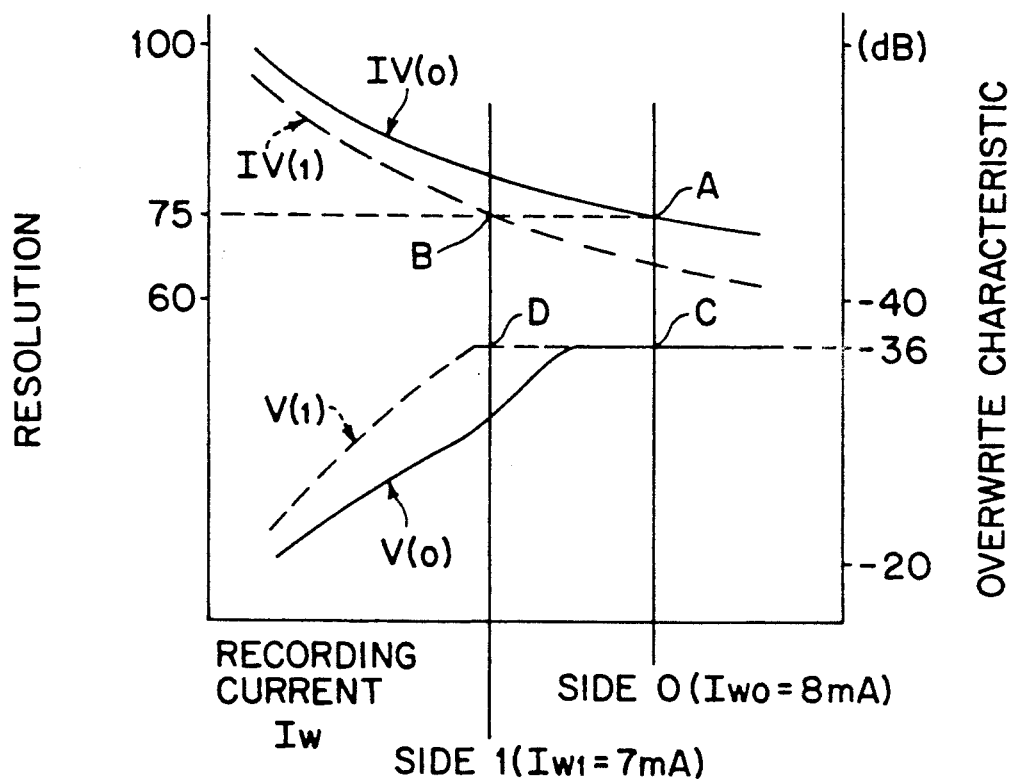
FIG. 8 is a graph showing the effect achieved by the apparatus of FIG. 7.
Figure 9A:
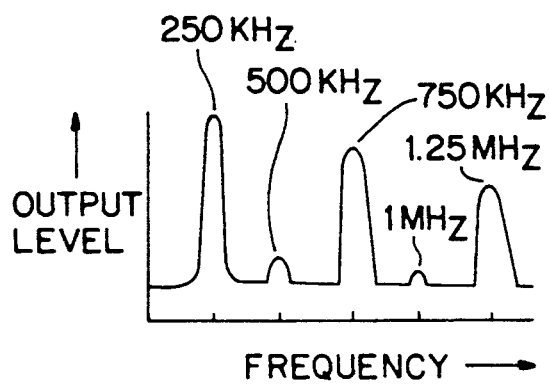
FIG. 9A shows an output spectrum before it is input into the low pass filter which represents a relationship between a frequency and an output level of a head which reproduces an information signal at the side O.
Figure 9B:
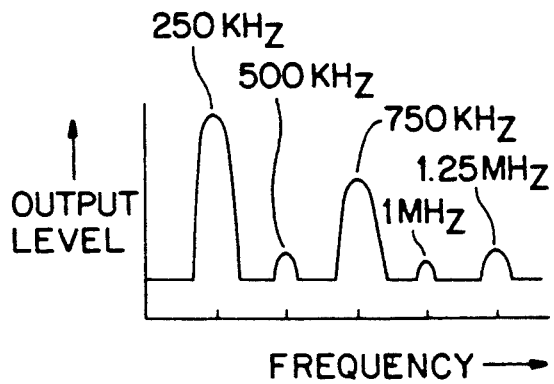
FIG. 9B shows an output spectrum before it is input into the low pass filter which represents a relationship between a frequency and an output level of a head which reproduces an information signal at the side I.
Figure 9C:
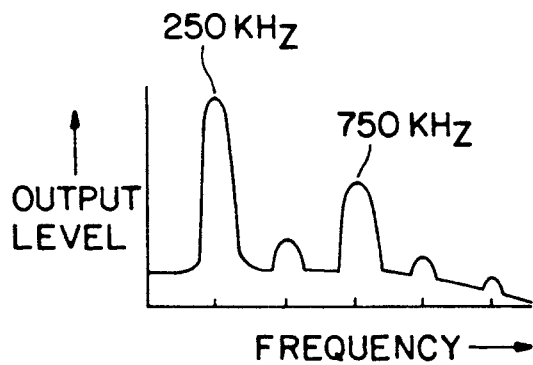
FIG. 9C shows an output spectrum after it is output from the low pass filter which represents a relationship between a frequency and an output level of a head which reproduces an information signal at the side 0.
Figure 9D:
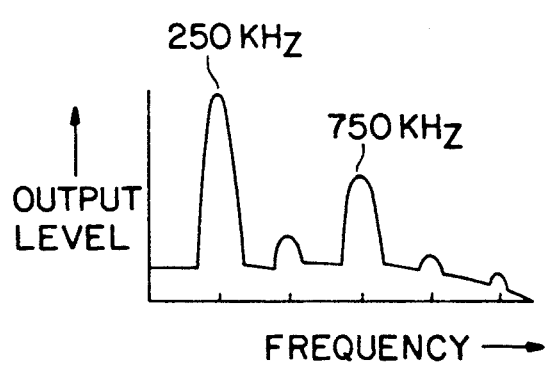
FIG. 9D shows an output spectrum before it is output from the low pass filter which represents a relationship between a frequency and an output level of a head which reproduces an information signal at the side I.
Figure 9E:
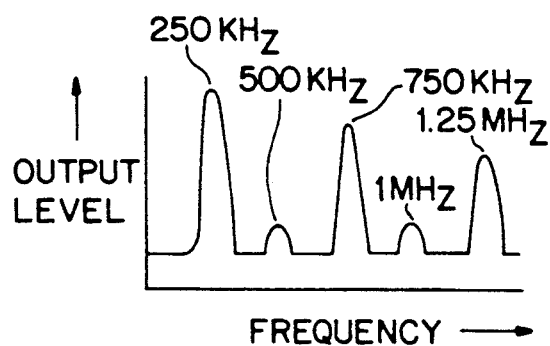
FIG. 9E shows an output spectrum before it is input into the differentiation circuit which represents a relationship between a frequency and an output level of a head which reproduces an information signal at the side O.
Figure 9F:
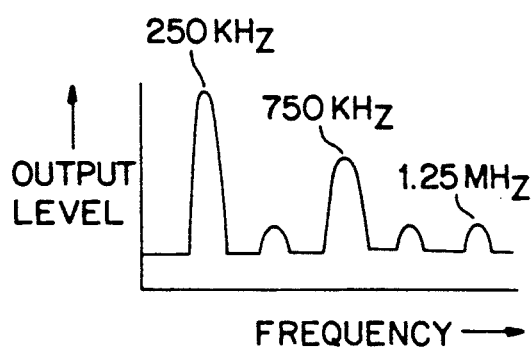
FIG. 9F shows an output spectrum before it is input into the differentiation circuit which represents a relationship between a frequency and an output level of a head which reproduces an information signal at the side I.
Figure 9G:
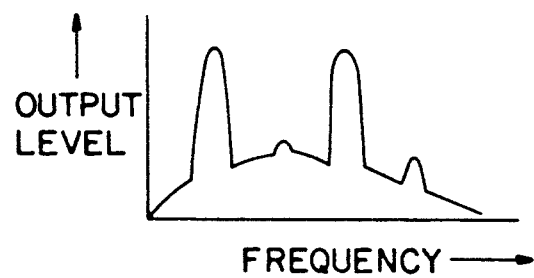
FIG. 9G shows an output spectrum after it is output from the differentiation circuit in which a Q-factor is adjusted, the output spectrum representing a relationship between a frequency and an output level of a head which reproduces an information signal at the side Q.
Figure 9H:
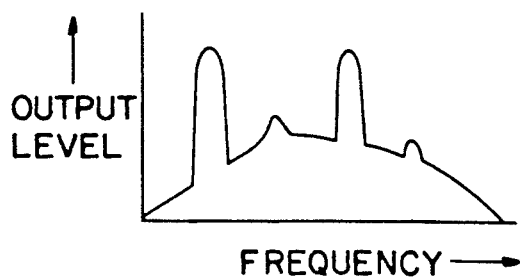
FIG. 9H shows an output spectrum after it is output from the differentiation circuit in which a Q-factor is adjusted, the output spectrum representing a relationship between a frequency and an output level of a head which reproduces an information signal at the side I.
Figure 9I:
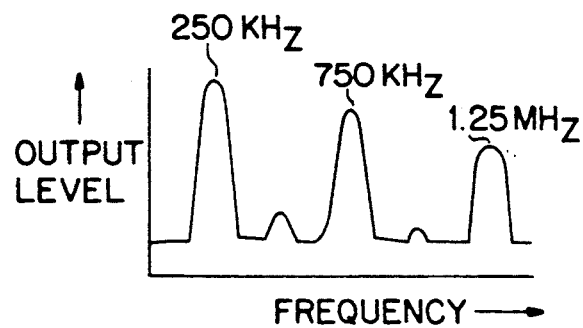
FIG. 9I shows an output spectrum before it it input into the differentiation circuit which represents a relationship between a frequency and an output level of a head which reproduces an information signal at the side O.
Figure 9J:
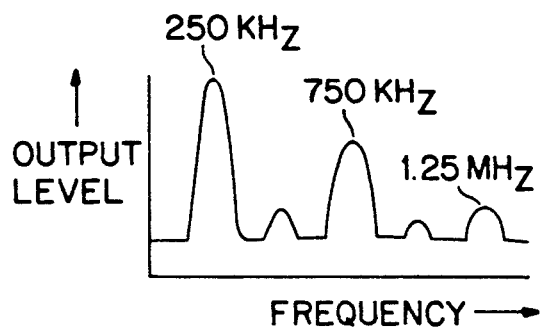
FIG. 9J shows an output spectrum before it it input into the differentiation circuit which represents a relationship between a frequency and an output level of a head which reproduces an information signal at the side I.
Figure 9K:
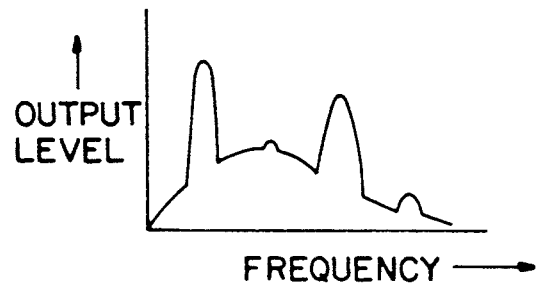
FIG. 9K shows an output spectrum after it is output from the differentiation circuit in which a resonance frequency is adjusted, the output spectrum representing a relationship between a frequency and an output level of a head which reproduces an information signal at the side O.
Figure 9L:
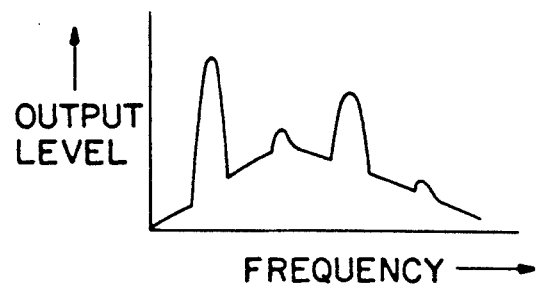
FIG. 9L shows an output spectrum after it is output from the differentiation circuit in which a resonance frequency is adjusted, the output spectrum representing a relationship between a frequency and an output level of a head which reproduces an information signal at the side I.

Before giving a detailed description of the operation of the system 40 of this embodiment, a description will be given for a relation between the recording current and the resolution as well as for a relation between the recording current and an overwrite characteristic with reference to FIG. 8 showing the resolution and the overwrite characteristic as a function of the recording current $I_W$ for a stationary carriage position. In the drawing, the resolution of the information signal at the side O of the disk 14 is represented by a line IV(0) and the resolution of the information signal at the side I is represented by a line IV(1). As the read/write head part 12a is located close to a center of the disk relative to the read/write head part 13a by a distance corresponding to eight track pitches, the resolution of the signal for the side I is always lower as compared to the resolution for the side O. It can be seen that the resolution decreases for both the side I and the side with increasing recording current $I_W$. At the same time, it can be seen that the difference in the resolution between the side O and the side I gradually increases with increasing recording current $I_W$.

In FIG. 8, the overwrite characteristic of the side O of the disk is represented by a line V(0) and the overwrite characteristic of the side I of the disk is represented by a line V(I). Here, the overwrite characteristic is defined as a ratio X/Y wherein X stands for a residual output reproduced from a track after recording a modulated signal having a maximum frequency used in the modified frequency modulation (MFM) system in superposition to another modulated signal having a minimum frequency of the MFM system already recorded on the same track, and B stands for an output obtained by once recording the signal with the minimum frequency on the track and thereafter reproducing it therefrom.

As can be seen from the lines V(0) and V(1), there appears saturation of the overwrite characteristic with increase in the recording current, and the saturation appears earlier in the side I as compared to the side O. The object of the system 40 is to equalize the resolution and the overwrite characteristic in the side I and the side O of the disk by changing the level of the recording current.

In the system 40, the switch $SW_3$ is controlled by the side select signal supplied thereto from the controller 21A via the line 27 as shown in the following TABLE IV.

TABLE IV

| CHANGE OF THE RECORDING CURRENT | | |
|---|---|---|
| Side select signal | $SW_3$ | Recording current $I_{W1}$ ($I_{W0}$) |
| H | OFF | $I_{W1} = V_{cc}/R_1 = 7.00$ mA |
| L | ON | $I_{W0} = V_{CC} \cdot R_1 \cdot R_a/(R_1 + R_a)$ |
| | | $= 8.00$ mA |

When recording, the switch $SW_2$ is connected to the contact W as already described. When the information signal is recorded on the side I of the disk 14, the switch $SW_1$ is switched to the contact (1) by the side select signal H and the switch $SW_3$ is opened. Thus, the information to be recorded is modulated on the recording current $I_{W1}$ ($=7$ mA) and the drive current $I_{W1}$ is supplied to the read/write head part 12a after passing through the switches $SW_2$ and $SW_1$ whereby the recording is made on the side I of the disk 14

When the side select signal L is supplied from the control circuit 21A, the switch $SW_1$ is connected to the contact (0) and the switch $SW_3$ is turned on at the same time Responsive to the turn-on of the switch $SW_3$, the resistance which determines the level of the recording current is formed as a combined resistance of the resistors $R_1$ and $R_a$ connected in parallel to each other. As the combined resistance thus formed is substantially smaller than the resistance $R_1$, the recording current $I_{W1}$ is increased to $I_{W0}$ which may be 8 mA, for example. The information is thus modulated on this current $I_{W0}$ and the current $I_{W0}$ is supplied to the read/write head part 13a after passing through the switches $SW_2$ and $SW_1$ whereby the recording is made on the side O of the disk 14.

Next, the signal characteristic of the reproduced signal will be described.

At first, the switch $SW_2$ is connected to the contact R. Then, the controller 21A supplies the side select signal L to the switch $SW_1$ which drives the switch $SW_1$ to engage with the contact (0) wherein the reproduced information signal picked up by the read/write head part 13a is supplied to the reproducing system 25A after passing through the switches $SW_1$ and $SW_2$. When the side select signal is changed from the signal L to the signal H, on the other hand, the switch $SW_1$ is switched to the contact (1) and the information signal reproduced by the read/write head 12a is supplied to the reproducing system 25A after passing through the switches $SW_1$ and $SW_2$. As the information signals are recorded on the side I and side O by changing the magnitude of the recording current $I_W$ as already described, the information signal from the side O has a resolution of about 75 as represented by a point A in FIG. 8 and the information signal from the side I has a resolution of also about 75 as represented by a point B in FIG. 8. This means that the time margin for the information signal reproduced from the side I of the disk becomes substantially identical to the time margin for the information signal reproduced from the side O.

The overwrite characteristic for the side O is represented by a point C of FIG. 8 corresponding to an output level of $-36$ dB at which the line V(0) crosses a vertical line corresponding to the recording current $I_{WO}$ equal to 8 mA, while the overwrite characteristic for the side I is represented by a point D corresponding to an output level of $-40$ dB at which the line V(1) crosses with another vertical line corresponding to the recording current $I_{W1}$. The both points are below $-30$ dB and are respectively satisfactory for the operation of the apparatus. In other words, the information signals are reproduced from the side I and the side O of the disk by the read/write head parts 13a and 12a with substantially identical resolution even when the head parts 13a and 12aare relatively displaced in the radial direction of the disk 14 by a distance d.

It should be noted that the levels of the recording current $I_{W0}$ and $I_{W1}$ which are switched in the system 40 of the present embodiment are set to be in a saturated region at which an identical overwrite characteristic is obtained.

Further, the systems 20 and 40 described heretofore are provided with conventional means, though not illustrated, to change the cutoff frequency so as to equalize the resolution of the information signal reproduced from the outer region of the disk to that of the information signal reproduced from the inner region of the disk. Such a switching of the cutoff frequency is usually made at the forty-fourth track when a 5.25-inch magnetic disk is used.

Further, the present invention is not limited to these embodiments but various variations and modifications may be made without departing from the scope of the present invention.

What is claimed is:

1. A dual head type magnetic disk recording/reproducing apparatus, in which a magnetic disk is inserted and/or from which said magnetic disk is ejected, said magnetic disk having a first surface and a second surface each of which is segmented into a plurality of tracks, each track having a corresponding track number, said dual head type magnetic disk recording/reproducing apparatus comprising:

a first magnetic head which reproduces a first information signal from a first track on said first surface by establishing a physical contact with said first surface;

a second magnetic head which reproduces a second information signal from a second track on said second surface by establishing physical contact with said second surface, said second magnetic head being offset in a radially outward direction with respect to said first magnetic head by a predetermined number of tracks that exist between said first track and said second track;

a low pass filter, coupled to said first and second magnetic heads, to which said information signals are supplied, said low pass filter having a cut-off frequency that can be changed between a first predetermined cut-off frequency and a second predetermined cut-off frequency;

control means, coupled to said low pass filter, said control means being supplied with a control signal indicative of which one of said first magnetic head and said second magnetic head is to be used, for controlling said low pass filter such that said cut-off frequency is set to said first predetermined cut-off frequency when said control signal indicates use of said first magnetic head and such that said cut-off frequency is set to said second predetermined cut-off frequency when said control signal indicates use of said second magnetic head;

said first predetermined cut-off frequency being set higher with respect to said second predetermined cut-off frequency to form a constant frequency offset upon switching from one side of said magnetic disk to the opposite side thereof independent of track position with said constant frequency offset selected such that said first information signal and said second information signal have substantially an identical output lever; and selection means, coupled to said first and second magnetic heads and said control means, for selecting either said first or second magnetic head under control of said control means and in response to said control signal, such that said first magnetic head is selected when said control signal indicates use of said first magnetic head, and such that said second magnetic head is selected when said control signal indicates use of said second magnetic head.

2. A dual type magnetic disk recording/reproducing apparatus according to claim 1, wherein said low pass filter comprises:

a resistor having a resistance R; and a capacitor having a capacitance C, and wherein said control means adjusts said cut-off frequency by means of varying at least one of said resistance R and the capacitance C.

3. A dual head type magnetic disk recording/reproducing apparatus, in which a magnetic disk is inserted and/or from which said magnetic disk is ejected, said magnetic disk having a first surface and a second surface each of which is segmented into a plurality of tracks, each track having a corresponding track number, said dual head type magnetic disk recording/reproducing apparatus comprising:

a first magnetic head which reproduces a first information signal from a first track on said first surface by establishing physical contact with said first surface;

a second magnetic head which reproduces a second information signal from a second track on said second surface by establishing a physical contact with said second surface, said second magnetic head being offset in a radially outward direction with respect to said first magnetic head by a predetermined number of tracks;

a resonance circuit, coupled to said first and second magnetic heads, to which said information signals reproduced by said first and second magnetic heads are supplied, said resonance circuit having a Q-factor that can be changed between a first predetermined value and a second predetermined value;

control means, coupled to said resonance circuit, said control means being supplied with a control signal indicative of which one of said first and second magnetic heads 55 is to be used, for controlling said resonance circuit such that said Q-factor is set to said first predetermined value when said control signal indicates use of said first magnetic head and such that said Q-factor is set to said second predetermined value when said control signal indicates use of said second magnetic head;

said first predetermined value being set larger than said second predetermined value to for a constant frequency offset upon switching from one side of said magnetic disk to the opposite side thereof independent of track position; such that said resonance circuit produces substantially an identical waveform when reproducing said first information signal and when reproducing said second information signal, provided that said first and second information signals are formed of a common information signal; and selection means, coupled to said first and second magnetic heads and said control means, for selecting either said first or second magnetic head under control of said control means and in response to said control signal, such that said first magnetic head is selected when said control signal indicates use of said first magnetic head, and such that said second magnetic head is selected when said control signal indicates use of said second magnetic head.

4. A dual head type magnetic disk recording/reproducing apparatus according to claim 3, wherein said resonance circuit comprises:
   a coil having an inductance L;
   a resistor having a resistance R; and
   a capacitor having a capacitance C, and
   wherein said control means adjusts said Q-factor by means of varying said resistance R.

5. A dual head magnetic disk recording/reproducing apparatus, in which a magnetic disk is inserted and/or from which said magnetic disk is ejected, said magnetic disk having a first surface and a second surface each of which is segmented into a plurality of tracks, each track having a corresponding track number, said dual head type magnetic disk recording/reproducing apparatus comprising:
   a first magnetic head which reproduces a first information signal from a first rack on a first surface; a magnetic head which reproduces a second information signal from a second track on said second surface, said second magnetic head being offset in a radially outward direction with respect to said first magnetic head by a predetermined number of tracks that exist between said first track and said second track;
   a resonance circuit, coupled to said first and second magnetic heads, to which said information signals reproduced by said first and second magnetic heads are supplied, said resonance circuit having a resonance frequency that can be changed between a first predetermined resonance frequency and a second predetermined resonance frequency;
   control means, coupled to said resonance circuit, said control means being supplied with a control signal indicative of which one of said first magnetic head and said second magnetic head is to be used, for controlling said resonance circuit such that said resonance frequency is set to said first predetermined resonance frequency when said control signal indicates use of said first magnetic head and such that said resonance frequency is set to said second predetermined resonance frequency when said control signal indicates use of said second magnetic head;
   said first resonance frequency being set higher that said second resonance frequency to form a constant frequency offset upon switching from one side of said magnetic disk to the opposite side thereof independent of track position with said frequency offset selected such that said first information signal and said second information signal have substantially an identical output level; and
   selection means, coupled to said first and second magnetic heads and said control means, for selecting either said first or second magnetic head under control of said control means and in response to said control signal, such that said first magnetic head is selected when said control signal indicates use of said first magnetic head, and such that said second magnetic head is selected when said control signal indicates use of said second magnetic head.

6. A dual head type magnetic disk recording/reproducing apparatus according to claim 5, wherein said resonance circuit comprises:
   a coil having an inductance L;
   a resistor having a resistance R; and
   a capacitor having a capacitance C, and
   wherein said control means adjusts said resonance frequency by means of varying at least one of said inductance L and said capacitance C.

* * * * *